United States Patent [19]

Gundal et al.

[11] 4,273,230
[45] Jun. 16, 1981

[54] INDEXING DRIVE DISCONNECT

[75] Inventors: Peter H. Gundal, Centerville; Richard Briggs, East Sandwich, both of Mass.

[73] Assignee: Packaging Industries, Inc., Hyannis, Mass.

[21] Appl. No.: 963,427

[22] Filed: Nov. 24, 1978

[51] Int. Cl.³ .............................................. F16D 7/04
[52] U.S. Cl. ................................. 192/150; 192/56 R
[58] Field of Search ............. 192/150, 56 R; 425/214, 425/143

[56] References Cited

U.S. PATENT DOCUMENTS

| | | | |
|---|---|---|---|
| 3,379,034 | 4/1968 | Gustafson | 192/56 R X |
| 3,599,067 | 8/1971 | Wallis | 192/150 X |
| 3,608,686 | 9/1971 | Martin, Sr. et al. | 192/150 |
| 3,981,382 | 9/1976 | Bollinger | 192/150 |
| 4,142,616 | 3/1979 | Dekoninck | 192/56 R |

*Primary Examiner*—Kenneth Downey
*Attorney, Agent, or Firm*—Brumbaugh, Graves, Donohue & Raymond

[57] ABSTRACT

A disconnect assembly releases a conveyor chain from a driven shaft. The connection between the driving shaft and the chain is by means of tapered pins associated with a driven plate or hub received in tapered holes on a plate attached to the driving shaft. The driven plate or hub carries a sprocket for the chain drive. An overload on the chain drive causes the tapered pins to ride out of the recesses. This activates a pressure cylinder that continues to withdraw the pins for a positive disconnect. Also, the pressure cylinder can bring about a disconnection on command. Limit switches detect a disconnect and then permit restarting the conveyor only when the chain and its drive are appropriately positioned. A set of disconnect plates located on the driving shaft engage rollers that both activate the disconnect and transmit its condition to the limit switches.

8 Claims, 9 Drawing Figures

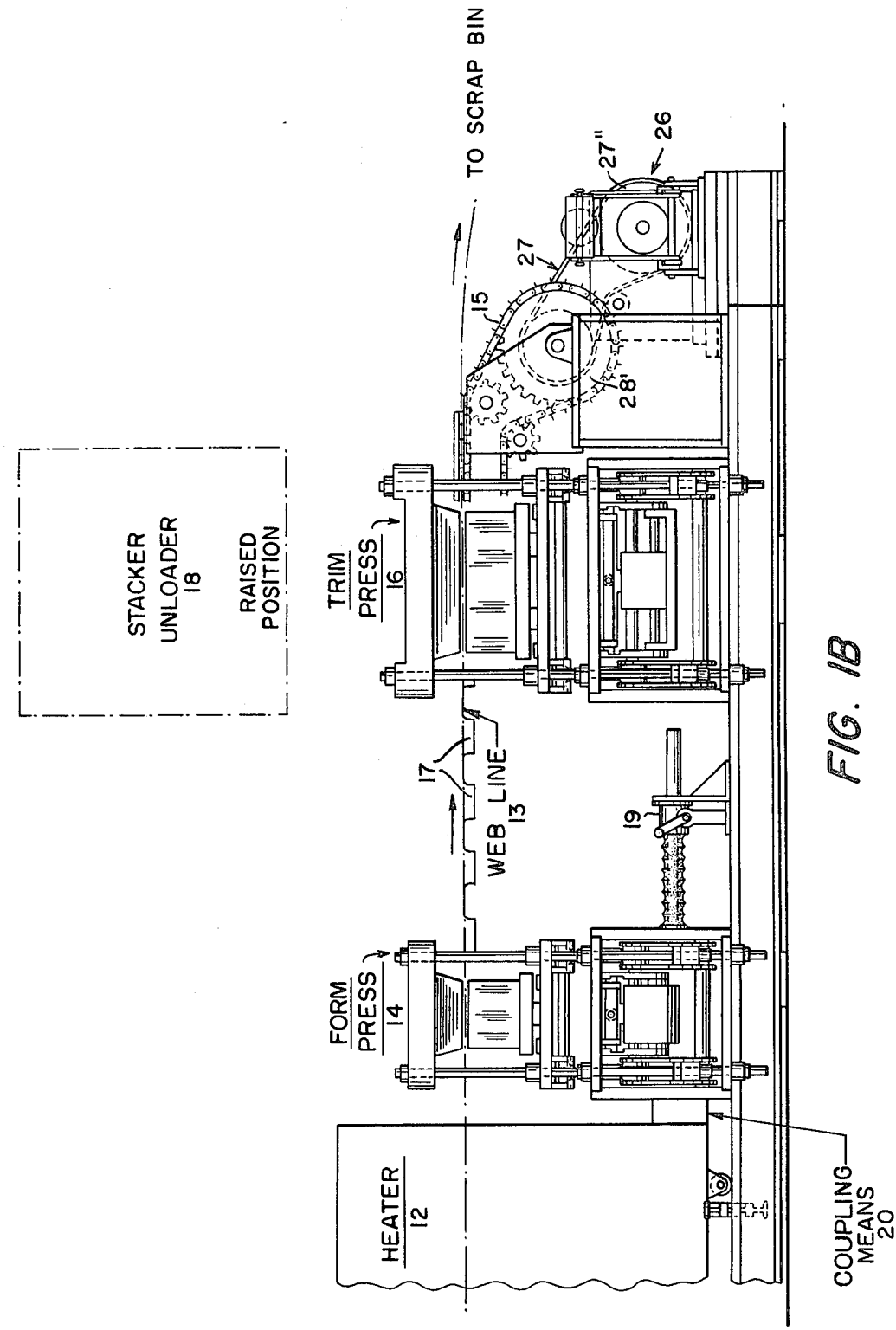

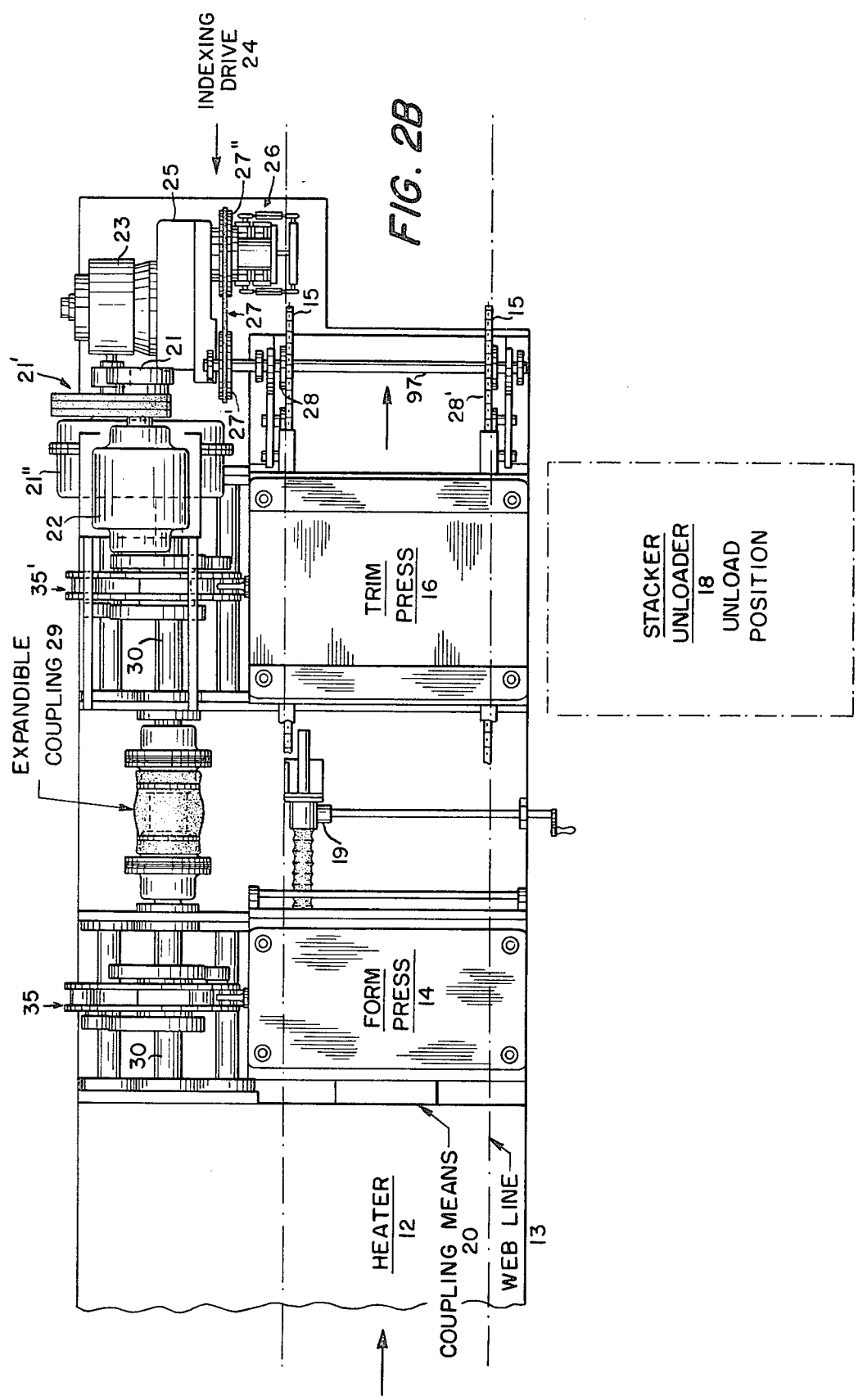

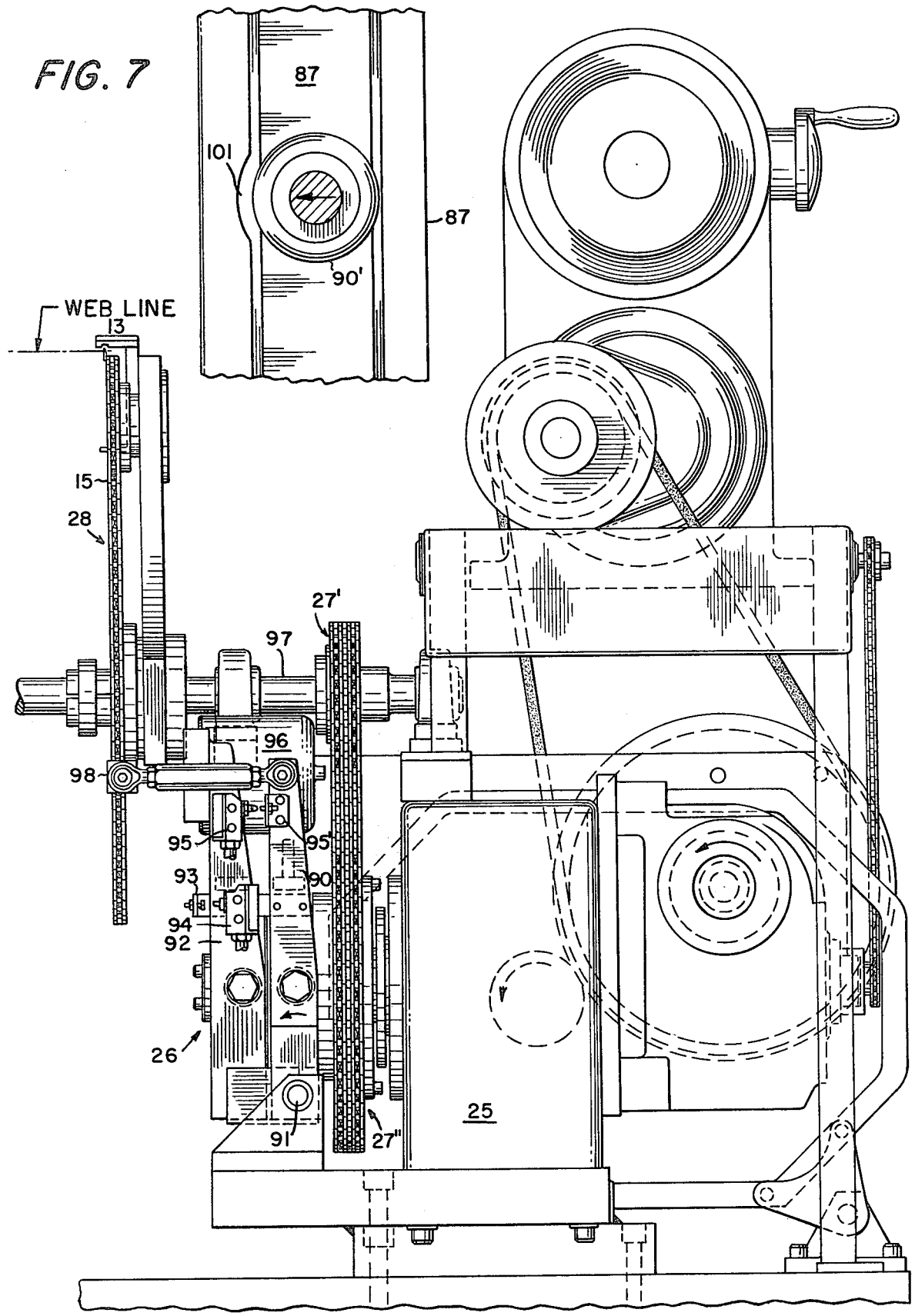

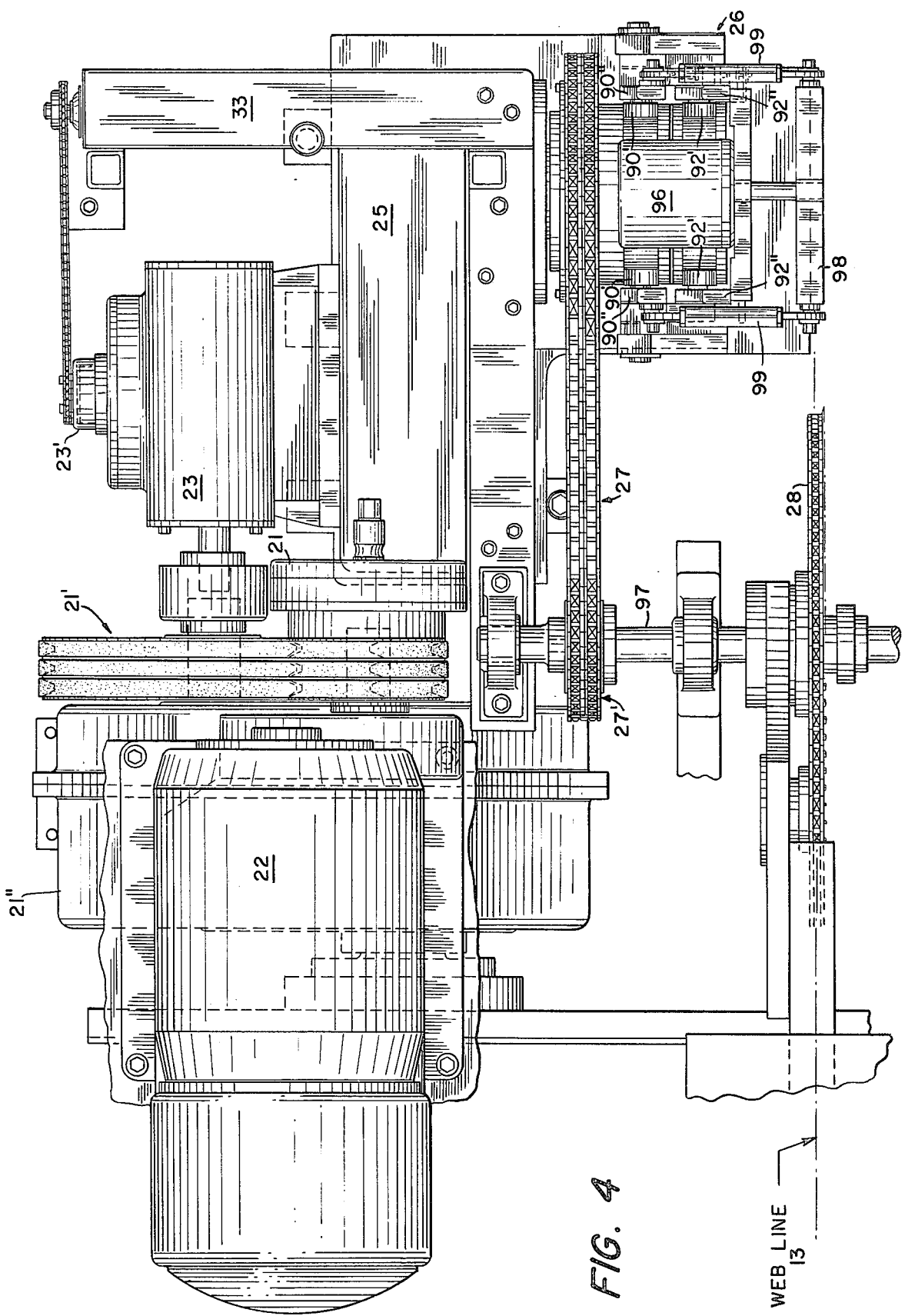

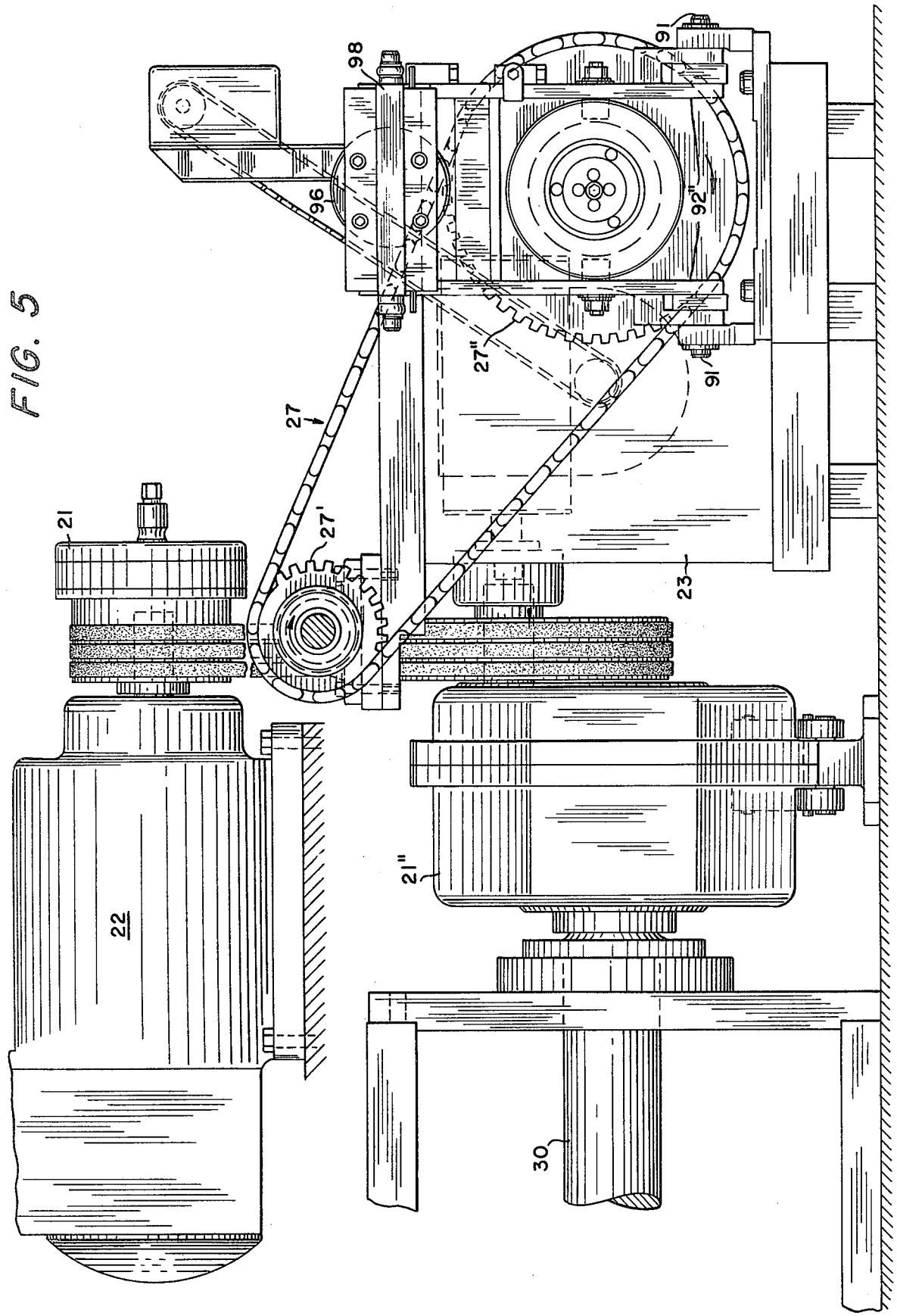

INDEXING DRIVE DISCONNECT

BACKGROUND OF THE INVENTION

The invention relates to apparatus for forming articles, such as containers, from a web of plastic material and more particularly, to a drive mechanism for moving the web through the apparatus.

Machines for forming articles, such as containers, from a thermoplastic web are well known. These machines usually have the web of material in the form of a roll at one end of the machine. The web is drawn through the sections of the machine in intermittent steps by an indexing drive that operates conveyor guide chains which grip the edges of the web. In the first section of the machine the web is heated until it softens. As the web passes into the next section of the machine, upper and lower dies are brought into contact with it by a forming press so as to mold it into the desired shape. In some cases the press also has a blade which cuts the formed container from the rest of the web; such a device is shown in U.S. Pat. No. 3,561,057 to Robert Butzko. However, there may also be a separate trim or trimming press as shown in U.S. Pat. No. 3,647,335 issued to Fred Brown, Jr. and assigned to the assignee of the present invention. After the container is cut from the web it is stacked at one location while the excess web is directed into a waste bin.

The forming press with its molding or forming dies it typically driven from a main shaft that also drives the trim press and, through intermediate provisions, the guide chain, so that all of the parts of the machine act in the proper sequence. Various cams are located on the main shaft and are used to impart a reciprocating motion to push rods that operate linkages connected to the forming and trim presses. With respect to machines with separate forming and trim presses, the reciprocating push rods can be connected to separate toggle linkages that bring about an opening and closing of the dies.

In the forming press of the machine described in U.S. Pat. No. 3,647,335 to Brown, two separate push rods are connected to the cam shaft and each drives a separate set of toggle linkages, one for the lower die and one for the upper die. Each toggle linkage set has two pairs of members with ends pivotally connected to each other and centrally tied together by an intermediate linkage. The other ends of the toggle linkages are connected to the press frame and one of the dies, respectively.

In U.S. Pat. No. 3,647,335 to Fred Brown, Jr. there is a continuous conveyor chain on each side of the web, which chains are provided with gripping members that grasp the edges of the web. The chains are each entrained about sprockets located at the ends of the machine. Shafts attached to the sprockets contact gears that mesh with gears on a cross shaft connecting them. A commercial crossover cam index is supplied with motive force by a sprocket and chain drive mounted on the main shaft and in turn produces intermittent drive for the cross shaft.

In another patent issued to Fred Brown, Jr. and assigned to the assignee of the present invention, i.e. U.S. Pat. No. 3,659,993, there is shown apparatus for forming containers from a web in which a pin chain for guiding the web, a forming press, a printing press, and a blanking press are all driven from one power shaft. The power shaft is connected to a chain and sprocket drive by means of a jaw clutch. The sprocket drive is moved by the apparatus motor and the jaw clutch is operated by a pneumatic cylinder. Caliper brakes, which operate on disks mounted on the power shaft, are also provided on the power shaft. In the event of an emergency, the apparatus can be quickly stopped by operating the pneumatic cylinder to open the jaw clutch and by operating the brakes.

Since the machines set forth herein are heavily constructed and each press and the chain drive are operated from the main shaft, it can be difficult to stop the chain drive for the web in the event of an emergency merely by disconnecting the main shaft from the motor and applying a brake. Also, it is highly desirable that the chain drive be automatically disconnected if it is subjected to a tension overload, such as might occur if an implement, for example, becomes caught in the conveying chains. Additionally, it can be desirable to stop the chain drive without stopping the presses and other apparatus attached to the main shaft.

SUMMARY OF THE INVENTION

The present invention is directed to providing a simple indexing drive for the chains that lead a plastic web through container forming apparatus, wherein the indexing drive can be disconnected from a main drive shaft upon command or automatically in the case of a tension overload on the indexing drive.

In an illustrative embodiment of the invention the container forming apparatus is driven by a main shaft that is coupled to a motor by appropriate gears and a clutch. A brake is also provided on the main shaft. By means of cams located on the main shaft, a forming press molds containers in a thermoplastic web which has to be softened by the application of heat. Another set of cams on the main shaft operate a trim press which separates the molded containers from the web.

In order to move the web past the heater, forming press and trim press, a pair of continuous conveyor chains with gripping devices, e.g. pin chains, hold the edges of the web. These chains, which are moved in unison by a cross shaft, are also operated from the main shaft by means of an indexing cam. The indexing cam has an output shaft that imparts an intermittant motion to the chains by a sprocket and chain drive that couples the output shaft to the cross shaft. A disconnect is provided to interrupt the driving reaction of the indexing cam output shaft and the conveyor chains. One sprocket of the sprocket and chain drive is maintained in driven relation with the indexed output shaft by means of cam pins located in mating recesses of a disk affixed to the output shaft. If the conveyor chains are subjected to a load that exceeds a fixed maximum, the cam pins will ride up and out of the recesses, thus disconnecting the sprocket and chain drive from the output shaft that drives them. A pneumatic cylinder is also connected to the sprocket in such a way that activation of the assembly will cause the sprocket to move away from the disk so that the cam pins are no longer in the recesses. This also results in a disconnection of the drive for the conveyor chains. Limit switches associated with the disconnect sense the release of the disconnect and also prevent reactivation of the machine until the conveyor chain drive and conveyor chains are correctly interrelated for continued operation relative to the remaining stations of the machine.

BRIEF DESCRIPTION OF THE DRAWINGS

The foregoing and other features of the present invention will be more readily apparent from the following detailed description and drawings of an illustrative embodiment of the invention in which:

FIGS. 1A and 1B are a schematic side view of a machine for forming containers from a plastic web;

FIGS. 2A and 2B are a schematic top view of the machine of FIG. 1;

FIG. 3 is a side view of the indexing drive assembly of the machine of FIG. 1 on an enlarged scale;

FIG. 4 is a top view of the indexing drive of FIG. 3;

FIG. 5 is a front view of the indexing drive assembly of FIG. 3;

FIG. 7 is a fragmentary sectional view along the line VII—VII of FIG. 6.

DESCRIPTION OF AN ILLUSTRATIVE EMBODIMENT

Figure 1A:
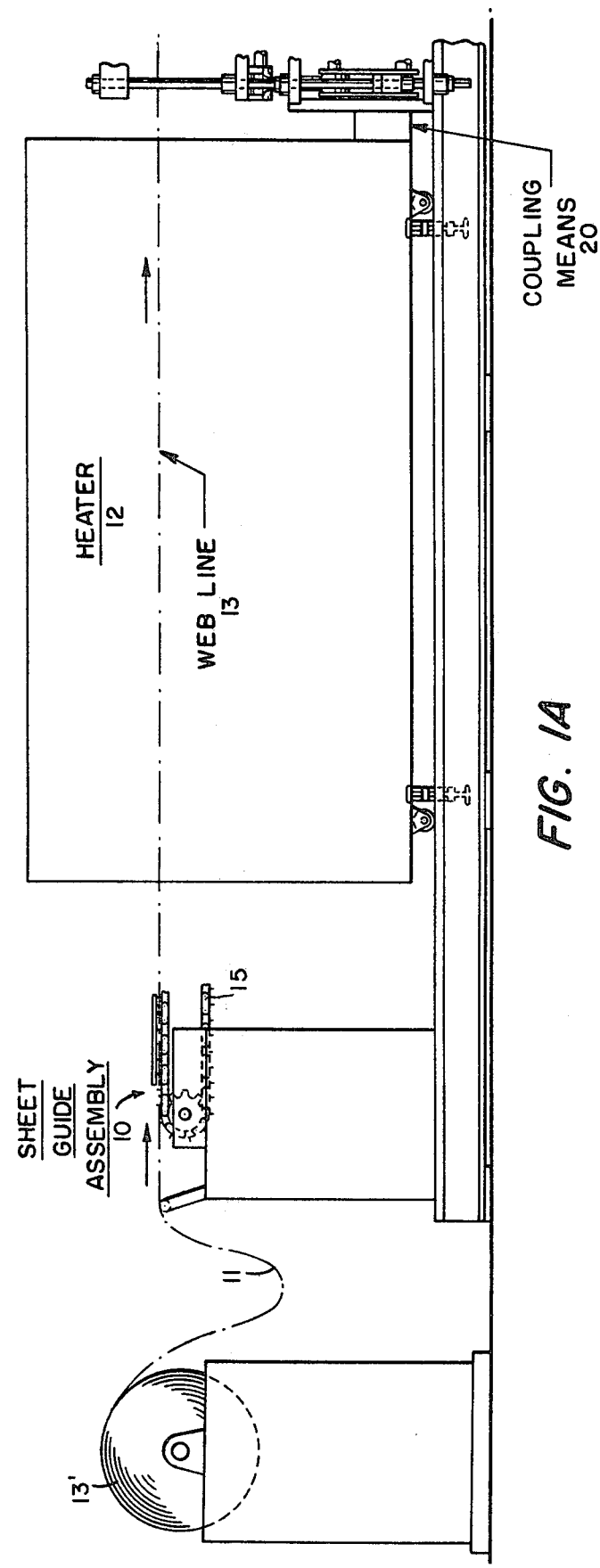
Figure 2A:
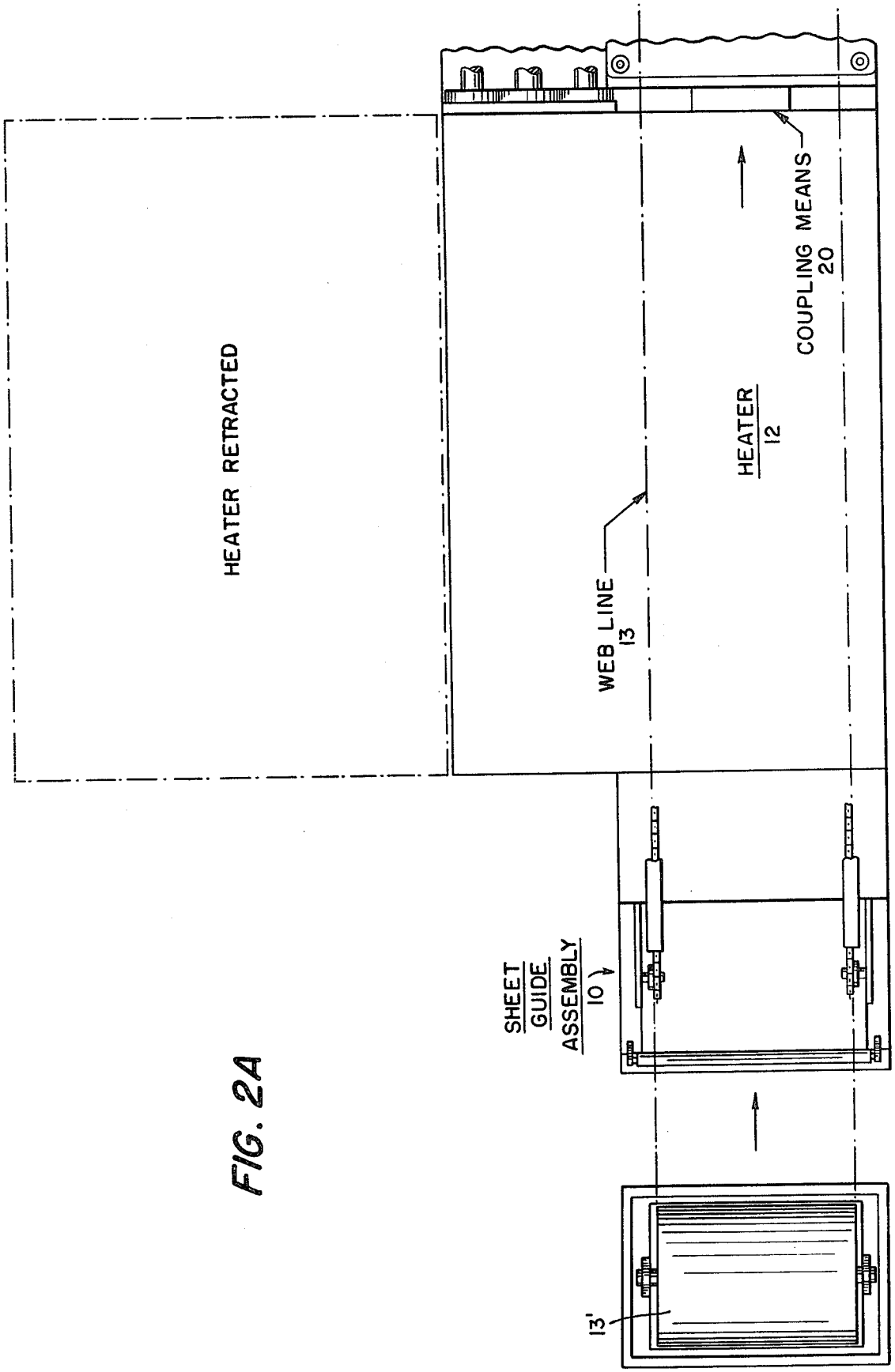

In FIGS. 1 and 2 there is shown a machine capable of forming articles, such as containers, from a web 13 of thermoplastic material. A more detailed description of the machine is contained in copending applications Ser. No. 963,419 of Peter Gundal filed (concurrently herewith), entitled "Apparatus with Movable Heater and Press for Forming Containers from a Plastic Web", and Ser. No. 963,426 of Fred Brown, Jr. filed (concurrently herewith), entitled "Container Forming Machine and Controls", both of which are assigned to the assignee of the present invention. The disclosures of these applications are incorporated herein by reference.

The web 13 of the machine is stored in the form of a roll 13' and is unwound in such a manner as to form a loop 11. This loop is maintained to permit the unwinding of the roll 13' while the web moves intermittently through the machine by means of continuous conveyor pin chains 15 that grip the edges of the web and convey and guide the web through the machine. A sheet guide assembly 10 supplies the web to the pin chains.

The pin chains, under the control of an indexing drive 24, first draw the web from guide assembly 10 that provides the web to the chains into a heater unit 12 which has banks of heaters defining several heat zones. The temperature of the web is gradually increased as it is stepped through the heater. By the time the web leaves the heater 12 it is soft and pliable. Immediately following the heater there is a forming press 14. Through the use of molding dies above and below the web, press 14 imparts the desired shape to a portion of the web. The web with the articles or containers 17 formed in it is then moved to a trim press 16. Like the forming press 14 the trim press has upper and lower dies. The trim press dies are designed to sever the formed containers from the web. The upper die is hollow so that when the container is trimmed from the web, it is pushed upward through the upper die and is stacked above it in stacker/unloader 18 shown in block diagram form. When a present number of containers have been stacked they are removed automatically by an elevator of the stacker/unloader 18 located above the trim press upper die. The elevator moves upward to a raised position and then horizontally in its elevated position to a located beside the trim press where it lowers the finished containers and deposits them on a collecting table.

The drive for the machine in FIGS. 1 and 2 is a motor 22 which turns a main shaft 30 via a clutch 21, belt drive 21' and reducing gear 21". In addition, a brake (not shown) is provided on the main shaft. By means of the belt drive 21', the indexing conveyor chains 15 are moved in steps synchronized with the operation of the heaters and presses. The indexing drive 24 includes a gear 23, a commercial crossover cam index unit 25 and a chain drive 27, which drives a pair of sprockets 28 connected by a cross shaft 97, about which the pin chains 15 are entrained (FIGS. 1B and 2B). In order to provide for overload protection a chain disconnect assembly 26 is provided.

For driving the forming and trim presses in synchronism with the movement of the web, assemblies (35,35') with conjugate cams are located on the main shaft 30 by the presses. These cams drive toggle linkages on the presses. A more detailed description of the press drives is given in copending, commonly owned applications, Ser. No. 963,428 to Richard Briggs filed (concurrently herewith), entitled "Reciprocating Drive Disconnect", and Ser. No. 963,425 to Peter Gundal filed (concurrently herewith), entitled "Press Platen Drive", both of which are assigned to the assignee of the present invention. The disclosures of these applications are incorporated herein by reference.

Registration of the trim press 16 with respect to the forming press 14 and the heater 12 is by means of a jack 19 and a coupling 20. This motion is accommodated on drive shaft 30 by an expansible coupling 29.

Figure 6:
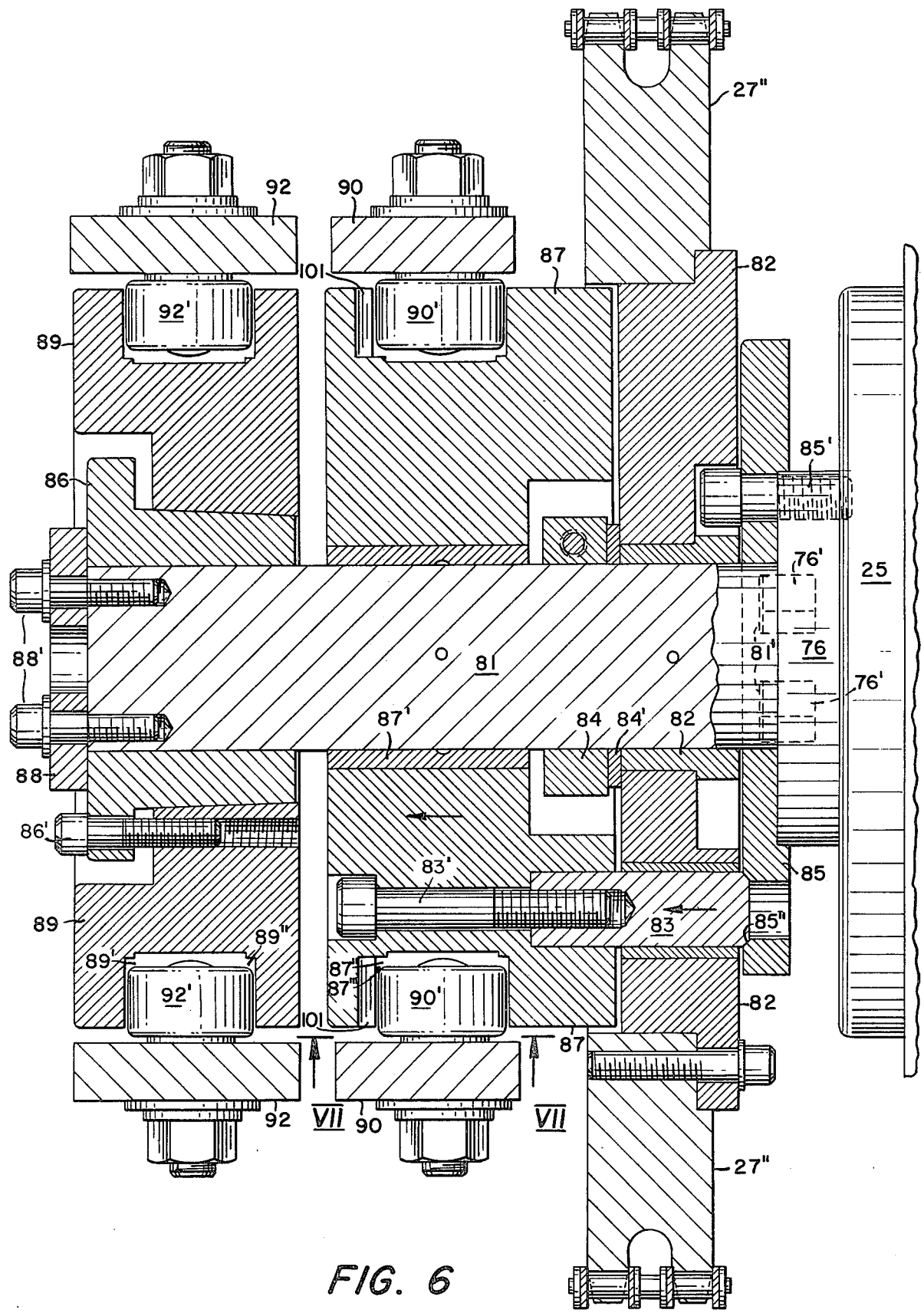
FIG. 6 is a sectional view along line VI—VI in FIG. 5.

In FIGS. 3–7 the pin chain drive and the disconnect 26 are shown in more detail. The crossover cam index unit 25, which converts the continuous rotary motion of main shaft 30 into incremental rotations, may be a Camco 900 P4H72-120 unit manufactured by the Cam Manufacturing Co. An output shaft 76 of the cam index unit is keyed to a central shaft 81 of the index disconnect unit as best seen in FIG. 6. This is accomplished with oblong slots 81' in the central shaft, that receive keys 76' on the end of cam output shaft 76. Sprocket 27" of chain drive 27 is mounted on shaft 81 via a carrier plate or hub 82 and bearing 82'.

Located within the carrier plate 82 are bores that retain tapered cam pins or lugs 83. Only one such tapered pin is shown, but typically there would be three or more such pins spaced symmetrically about the plate 82. Four have proven satisfactory. These pins seat within tapered recesses 85" in a cam plate 85 affixed on the cam output shaft 76 by screws 85'. Since the screws 85' attach cam plate 85 to the output shaft 76, and the tapered cam pins 83 connect the cam plate 85 to the plate 82 that carries the sprocket 27", rotation of the shaft 76 causes sprocket 27' to rotate. By means of a chain connecting a sprocket 27' to the sprocket 27" the rotation of the cam output shaft 76 is transmitted to a pin chain cross shaft 97 (FIG. 3). Located at one end of shaft 97 is a sprocket 28 on which the pin chain 15 for one side of the web is located. Shaft 97 also extends the width of the web path to its other side where the shaft similarly drives a sprocket 28' on which the other pin chain is located (FIG. 2B). In this manner, when the main shaft 30 drives the presses, it also drives the pin chains 15 in intermittent steps via the gear or gear box 23, indexing cam unit 25 and the interconnecting parts just described.

If the pin chains 15 encounter an overload, such as an object caught between the pin chain and a fixed machine part, the disconnect assembly will disconnect the drive from the pin chain and shut down the machine. This occurs because excessive tension applied by a chain 15 to the sprocket 27" will cause the taper pins 83 to ride up out of the recesses 85" in cam plate 85, thus breaking the connection between cam shaft 76 and sprocket 27" (FIG. 6). The bearing 82' permits the carrier plate 82 to remain stationary as the shaft 81 turns. In addition the axial motion of pins 83 in the direction of the unnumbered arrow thereon when the pins ride out of the recesses 85" produces a similar motion in a circular disconnect lever drive plate 87. This plate is mounted on the central shaft 81 via a bearing 87' and holds a bolt 83' which screws into the taper pin 83. A peripheral recess or channel 87" in the periphery of the plate 87 receives a pair of rollers 90' rotatably attached to a pair of arms 90" of a bifurcated lever 90 of the disconnect assembly 26. Another circular lever plate 89 also has a peripheral recess or channel 89'. This receives rollers 92' rotatably attached to a pair of arms 92" of another bifurcated lever 92 of the disconnect assembly. Disconnect plate 89 is mounted on the central shaft 81 by a sleeve 86 affixed to the shaft. A set of bolts 86' attach the plate 89 to the sleeve 86 for rotation therewith. A ring 88 is bolted with bolts 88' to the shaft and locates the sleeve 86 at the shaft end. By adjusting bolts 86' the plate 89 can be moved on the sleeve 86 affixed to the shaft 81, thus adjusting the spacing of the plate 89 relative to the plate 87. A collar 84 on the shaft 81 cooperates with a bearing 84' that abuts the sprocket carrier plate 82, and keeps the plate 82 from moving axially on the shaft 81.

During a disconnect as a result of an overload on the pin chain, when the taper pins 83 ride out of the recesses and cause the lever drive plate 87 to move, the lever 90, which is pivoted at an axis 91 (FIG. 3) pivots in the direction of the arrow thereon. Motion in this direction causes a striker 93 on the lever 90 to release a limit switch 94 on the lever 92. Operation of this limit switch 94 causes pressure to be applied to a pneumatic cylinder 96, thereby forcing its piston rod outward. The piston rod is connected to a cross bar 98 and to tie rods 99 pivotally attached to the top of the lever 90. As a result the lever continues to move under the impetus of the piston rod, to cause a positive disconnection. Release of the limit switch 94 can also be employed to initiate an overall machine stopping procedure called "emergency stop".

To restart the machine after a jam, the jam is cleared by removing the blockage that has interfered with the movement of the pin chains 15 so that they are again free to move. The machine stations, e.g., heaters and presses are advanced to a predetermined position, their "cycle-stop" position, which can be for example their ordinary position at machine startup. At this point the cylinder 96 is still forcing the levers 90 and 92 towards each other and the rollers 90' and 92' are engaging the side walls 87' and 89" of the peripheral recesses 87" and 89', holding the plate 87 against return towards the cam output shaft. The chains 15 are advanced manually, for example by turning the cross shaft 97. This turns the sprocket 27" and the plate 87. When the chains reach a predetermined position, corresponding, for example, to the "cycle-stop position" at the beginning of a step forward, a pair of depressions 101 in the recess walls 87" align with the rollers 90' permitting the pneumatic cylinder 96 to force the levers 90 and 92 slightly closer as the rollers 90' ride into the depressions 101 (FIGS. 6 and 7). As a result of this motion a second striker 95' on lever 90 touches and activates a second limit switch 95 (FIG. 3).

The second limit switch 95 is an enabling limit switch that overrides limit switch 94 once the chains 15 and the driving cam 25 are in the correct position to be restarted. When the switch 95 is activated the rod of pneumatic cylinder 96 is driven in the reverse direction to force the levers 90 and 92 and the plates 87 and 89 apart. The plate 87 moves towards the cam output shaft 76. Since, the indexing unit is at or is brought to the start up position, the tapered pins 83 seat in the recesses 85" in the cam plate 85 and the assembly is ready to begin a cycle or stop forward. The first limit switch 92 is now engaged and the machine can now be run with the stations properly sequenced with respect to the intermittent motion of the pin chains 15.

Besides automatically disconnecting the index drive upon an overload, the index drive can be disconnected on command. Such a common, electrically initiated for example, causes pressure to be applied to pressure-cylinder assembly 96. This pivots lever 90 away from sprocket 27. As a result the plate 87 is pulled in the direction of the arrows in FIG. 6, thus withdrawing the taper pins 83 from the recesses in cam plate 85.

The disconnect 26 is thus capable of automatic emergency disconnection of a conveyor from its drive in the event of a jam or like malfunction, is able to effect the same disconnection at command, and provides correct sequencing of the conveyor, its drive and the remaining machine stations when it reconnects the conveyor and its drive.

While the present invention has been shown and described with reference to preferred embodiments thereof, it will be understood by those skilled in the art that various changes in form and details may be made therein without departing from the spirit and scope of the invention.

We claim:

1. A rotary disconnect assembly for disconnecting a rotary drive from a driven rotary member, the disconnect assembly including a shaft adapted to be rotated, means defining a driven surface supported on the shaft to be rotated with said shaft, at least one tapered recess formed in said surface, a disconnect member mounted on said shaft and slideably supported thereon to permit rotation of the shaft with respect to the disconnect member and to permit sliding movement of the disconnect member on the shaft in the axial direction, said disconnect member supporting at least one projection movable therewith and having a tapered end thereon receivable in the tapered recess to rotate the disconnect member with the surface and the shaft, said tapered projection end and tapered recess defining engaging cam surfaces such that the projection end is forced out of the recess upon application of a force retarding rotation of the projection relative to the surface having said recess and the disconnect member is moved axially to a disconnect position, the rotary disconnect assembly further comprising controllable means for moving the disconnect member axially on the shaft away from the surface having the recess to the disconnect position so as to move the tapered projection end out of the recess, whereby the rotary motion of the plate and shaft can be disconnected from the disconnect member upon actuation of the controllable means for moving, the disconnect member having a first peripheral channel about its outer circumference encircling the shaft, and the controllable means for moving including at least one roller received in the first peripheral channel, and a first lever member supporting the roller and being movable in one direction for forcing the roller against one wall of the channel to cause the disconnect member to move away from the surface with the tapered recess and being movable in the opposite direction for forcing the roller against an opposite wall of the channel to cause the disconnect member to move towards the surface.

2. The rotary disconnect assembly according to claim 1 further including rotatable carrier means for imparting the rotary motion of the shaft to machine parts to be driven, the rotatable carrier means being operatively connected to the disconnect member for rotary movement therewith.

3. The rotary disconnect assembly according to claim 2 wherein the rotatable carrier means for imparting the rotary motion is a rotary carrier member mounted on the shaft between the disconnect member and the surface having the recess, and the projection extends from the disconnect member through an opening in the carrier member to the recess, whereby the projection imparts rotary driving motion to the carrier member when the tapered end is received in the tapered recess.

4. The rotary disconnect assembly according to claim 1 further comprising position sensitive electrically switching means for preventing complete restarting of a machine at least partially driven by the disconnect assembly until the disconnect member mounted on the shaft has been rotated to a predetermined start-up position.

5. The rotary disconnect assembly according to claim 1, wherein the one wall of the first peripheral channel on the disconnect member has at least one depression formed therein, said roller moves into the depression when the disconnect member has been turned to a predetermined rotary position, movement of the roller into the depression causes slight further movement of the first lever member supporting the roller, and the assembly further includes a position sensitive electrical switching means mounted to detect the slight further movement of the first lever member, whereby the switching means detects the correct rotary position of the disconnect member for reconnection and start-up.

6. The rotary disconnect apparatus according to claim 1 further including a second disconnect member supported on the shaft and a second peripheral channel about the outer circumference of said second disconnect member and encircling the shaft, and wherein the controllable means for moving includes at least a second roller received in the second peripheral channel, a second lever member supporting the second roller, and motive means operatively connected between the first lever member and the second lever member for moving the two lever members and the two rollers to thereby move the first mentioned disconnect member on the shaft relative to the second disconnect member.

7. A rotary disconnect assembly for disconnecting a rotary drive from a driven rotary member, the disconnect assembly including a shaft adapted to be rotated, means defining a driven surface supported on the shaft to be rotated with said shaft, at least one tapered recess formed in said surface, a disconnect member mounted on said shaft and slideably supported thereon to permit rotation of the shaft with respect to the disconnect member and to permit sliding movement of the disconnect member on the shaft in the axial direction, said disconnect member supporting at least one projection movable therewith and having a tapered end thereon receivable in the tapered recess to rotate the disconnect member with the surface and the shaft, said tapered projection end and tapered recess defining engaging cam surfaces such that the projection end is forced out of the recess upon application of a force retarding rotation of the projection relative to the surface having said recess and the disconnect member is moved axially to a disconnect position, the rotary disconnect assembly further comprising controllable means for moving the disconnect member axially on the shaft away from the surface having the recess to the disconnect position so as to move the tapered projection end out of the recess, whereby the rotary motion of the plate and shaft can be disconnected from the disconnect member upon actuation of the controllable means for moving, position sensitive electrical switching means for controlling the operation of a machine at least partially driven by the disconnect assembly, the switching means being located to detect movement of the disconnect member to the disconnect position wherein the tapered projection end is removed from the tapered recess, the switching means being operatively connected to the controllable means for moving the disconnect member to cause the controllable means to retain the disconnect member in the disconnect position when the tapered projection end is cammed out of the tapered recess.

8. An overload sensitive rotary disconnect assembly for use in a machine having a conveying line, the assembly including a driven rotary shaft, means defining a surface carried by the shaft for rotation therewith, at least one tapered recess in the surface, a hub, means for connecting the hub in driving relation to the conveyor line, a first circular disconnect plate mounted on the shaft for rotation and axial sliding movement relative thereto, at least one pin projecting from the first disconnect plate through an opening in the hub and terminating in a tapered end formed to fit in the tapered recess and to form with the tapered recess cam surfaces for camming the pin axially out of the recess to drive the first disconnect member axially away from the surface having the recess, a first peripheral channel on the first disconnect member, a first pair of rollers located in the channel, a bifurcated, pivoted lever holding the rollers in the channel, a second circular disconnect plate mounted on the shaft, a second peripheral channel on the second disconnect plate, a second pair of rollers located in the second channel, a bifurcated member holding the second rollers in the second channel, motive means operatively connected between the bifurcated lever and the bifurcated member, a first limit switch located to detect movement of the bifurcated lever when the first disconnect plate moves axially away from the surface with the recess and moves the first rollers and the lever, at least one pair of depressions in the wall of the first channel farthest from the surface with the recess, a second limit switch mounted to detect slight further movement of the bifurcated lever when the first rollers reside in the depression.

* * * * *

UNITED STATES PATENT AND TRADEMARK OFFICE
CERTIFICATE OF CORRECTION

PATENT NO. : 4,273,230

DATED : June 16, 1981

INVENTOR(S) : Peter Henry Gundal and Richard Briggs

It is certified that error appears in the above-identified patent and that said Letters Patent are hereby corrected as shown below:

Column 1, line 29, "it" should read -- is --.

Column 3, line 61, "present" should read -- preset --;

Column 3, line 66, "located" should read -- location --.

Column 6, line 13, "stop" should read -- step --.

Signed and Sealed this

Fifteenth Day of September 1981

[SEAL]

Attest:

GERALD J. MOSSINGHOFF

Attesting Officer     Commissioner of Patents and Trademarks